United States Patent
Karame (10) Patent No.: US 10,728,021 B2
(45) Date of Patent: *Jul. 28, 2020

(54) METHOD AND SYSTEM FOR ENCRYPTING DATA WITH AN ALL-OR-NOTHING ENCRYPTION SCHEME HAVING ADDITIONAL RANDOMNESS

(71) Applicant: NEC CORPORATION, Tokyo OT (JP)

(72) Inventor: Ghassan Karame, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/423,209

(22) Filed: May 28, 2019

(65) Prior Publication Data
US 2019/0342075 A1 Nov. 7, 2019

Related U.S. Application Data

(63) Continuation of application No. 15/514,851, filed as application No. PCT/EP2014/070986 on Sep. 30, 2014, now Pat. No. 10,348,486.

(51) Int. Cl.
*H04L 9/06* (2006.01)
*G06F 17/14* (2006.01)

(52) U.S. Cl.
CPC .......... *H04L 9/0637* (2013.01); *H04L 9/0643* (2013.01); *G06F 17/142* (2013.01); *H04L 2209/08* (2013.01)

(58) Field of Classification Search
CPC . H04L 9/0637; H04L 9/0643; H04L 2209/08; G06F 17/142
See application file for complete search history.

(56) References Cited

U.S. PATENT DOCUMENTS 5,623,549 A 4/1997 Ritter
7,337,331 B2 2/2008 Yoshida
(Continued)

FOREIGN PATENT DOCUMENTS

JP 2009049731 A * 3/2009
WO WO-2014109059 A1 * 7/2014 ........... H04L 9/0894

OTHER PUBLICATIONS

Ghassan O Karame et al: "Securing Cloud Data in the New Attacker Model", International Association for Cryptologic Research vol. 20140718:123221, Jul. 16, 2014 (Jul. 16, 2014), pp. 1-19, XP061016654.
(Continued)

*Primary Examiner* — Shahriar Zarrineh
(74) *Attorney, Agent, or Firm* — Leydig, Voit & Mayer, Ltd.

(57) ABSTRACT

A method for encrypting data for storage on one or more servers includes dividing the data, which includes a first number m of plaintext blocks, into a second number N of equal sized chunks, wherein the second number is based on a number of the servers on which the encrypted data is to be stored, and wherein each chunk includes m/N plaintext blocks. Each of the chunks is encrypted using an all-or-nothing encryption (AONE) scheme so as to output a plurality of ciphertext blocks for each chunk, wherein an additional randomness is embedded into the AONE scheme by an initialization vector derived from the randomness being used as an initial seed for an AONE initialization vector of the AONE scheme. The randomness is encrypted using an XOR-combination of XOR operations performed on the ciphertext blocks for each chunk. The encrypted randomness is stored on each of the servers.

11 Claims, 4 Drawing Sheets

(56) References Cited

U.S. PATENT DOCUMENTS

| | | | |
|---|---|---|---|
| 7,985,614 B2 | 7/2011 | Maruyama et al. | |
| 8,351,600 B2 | 1/2013 | Resch | |
| 8,799,334 B1 * | 8/2014 | Stefanov ............... | G06F 21/577 707/821 |
| 2002/0181709 A1 | 12/2002 | Sorimachi et al. | |
| 2003/0174835 A1 | 9/2003 | Yokota et al. | |
| 2007/0160198 A1 | 7/2007 | Orsini et al. | |
| 2010/0208894 A1 | 8/2010 | True et al. | |
| 2010/0266119 A1 | 10/2010 | Leggette et al. | |
| 2010/0266120 A1 | 10/2010 | Leggette et al. | |
| 2010/0268966 A1 | 10/2010 | Leggette et al. | |
| 2010/0269008 A1 | 10/2010 | Leggette et al. | |
| 2010/0331088 A1 | 12/2010 | Culbert | |
| 2011/0182424 A1 | 7/2011 | Grube et al. | |
| 2012/0151224 A1 | 6/2012 | Koifman et al. | |
| 2012/0221854 A1 | 8/2012 | Orsini et al. | |
| 2013/0111218 A1 | 5/2013 | Starr | |
| 2013/0325820 A1 | 12/2013 | Grube et al. | |
| 2014/0244788 A1 | 8/2014 | Resch et al. | |
| 2014/0281550 A1 | 9/2014 | Resch et al. | |
| 2017/0126399 A1 | 5/2017 | Sorimachi | |

OTHER PUBLICATIONS

Claudio Soriente et al: "Commune Shared Ownership in an Agnostic Cloud", 25 Nov. 25, 2013 (Nov. 25, 2013), XP055191297.
Anand Desai, "The Security of All-or-Nothing Encryption: Protecting against Exhaustive Key Search", CRYPTO 2000: Advances in Cryptology—Crypto 2000, pp. 359-375, Aug. 11, 2000.
Ronald L. Rivest, "All-Or-Nothing encryption and the package transform", International Workshop on Fast Software Encryption; FSE 1997: Fast Software Encryption, pp. 210-218, May 17, 2006.

* cited by examiner

Fig. 4

METHOD AND SYSTEM FOR ENCRYPTING DATA WITH AN ALL-OR-NOTHING ENCRYPTION SCHEME HAVING ADDITIONAL RANDOMNESS

CROSS REFERENCE TO RELATED APPLICATIONS

This application is a continuation application of U.S. application Ser. No. 15/514,851 filed on Mar. 28, 2017, which is a U.S. National Stage Application under 35 U.S.C. § 371 of International Application No. PCT/EP2014/070986 filed on Sep. 30, 2014. The International Application was published in English on Apr. 7, 2016 as WO 2016/050287 A1 under PCT Article 21(2).

FIELD

The present invention relates to a method for at least partially updating data encrypted with an All-or-Nothing Encryption scheme stored on one or more servers. The present invention further relates to a system for at least partially updating data encrypted with an All-or-Nothing Encryption scheme stored on one or more servers.

Although applicable to servers in any kind of network infrastructure, the present invention will be described with regard to a cloud security network infrastructure.

BACKGROUND

Cloud security is gaining increasing importance in many applications and services nowadays. All-or-Nothing Encryption AONE has immerged as one of the methods that can be used to strengthen confidentiality of data. The All-or-Nothing Encryption AONE provides semantic security of the data while ensuring that the data can only be recovered if and only if all the ciphertext blocks are available for download by a given client. As such All-or-Nothing Encryption AONE does not solely rely on the secrecy of the encryption but also requires that any adversary has access to all the data in order to acquire any meaningful bit of the input plaintext. Therefore, All-or-Nothing Encryption AONE ensures a transparent key management process and complements information dispersal techniques that can be used to efficiently store the data in a distributed storage like a cloud.

All-or-Nothing Encryption schemes are for example disclosed in the non-patent literature of R. Rivest, "All-or-Nothing Encryption and The Package Transform" in Proceedings of Fast Software Encryption, pages 210-218, 1997, in the non-patent literature of Anand Desai", The Security of All-Or-Nothing Encryption: Protecting Against Exhaustive Key Search", in Proceedings of CRYPTO, 2000 as well as in the non-patent literature of Ghassan Karame, Claudio Soriente, Krzysztof Lichota, Srdjan Capkun, Technical Report, available from: http://eprintiacr.org/2014/556.pdf.

Such an All-or-Nothing Encryption AONE may be performed by the following procedures. Key generation: On input a security parameter, the key generation algorithm outputs a key K. Encryption routine: On input plaintext p which is comprised of m blocks of size 1 bits each, and on input an encryption key K, the encryption routine AONEnc outputs n=m+1 blocks of ciphertext. Decryption routine. On input key K, and the entire ciphertext blocks, the decryption algorithm AONDec outputs the plaintext blocks p. If all ciphertext blocks are not available, then the decryption algorithm outputs NULL.

An All-or-Nothing Encryption AONE entails that each encryption block of the data depends on the data in its entirety, coming at odds with performing file updates. For example a plaintext file of size of 5 TB cannot be easily updated since it is not workable to simply decrypt and re-encrypt a entire 5 TB every time the new file update needs to be performed.

Figure 1:
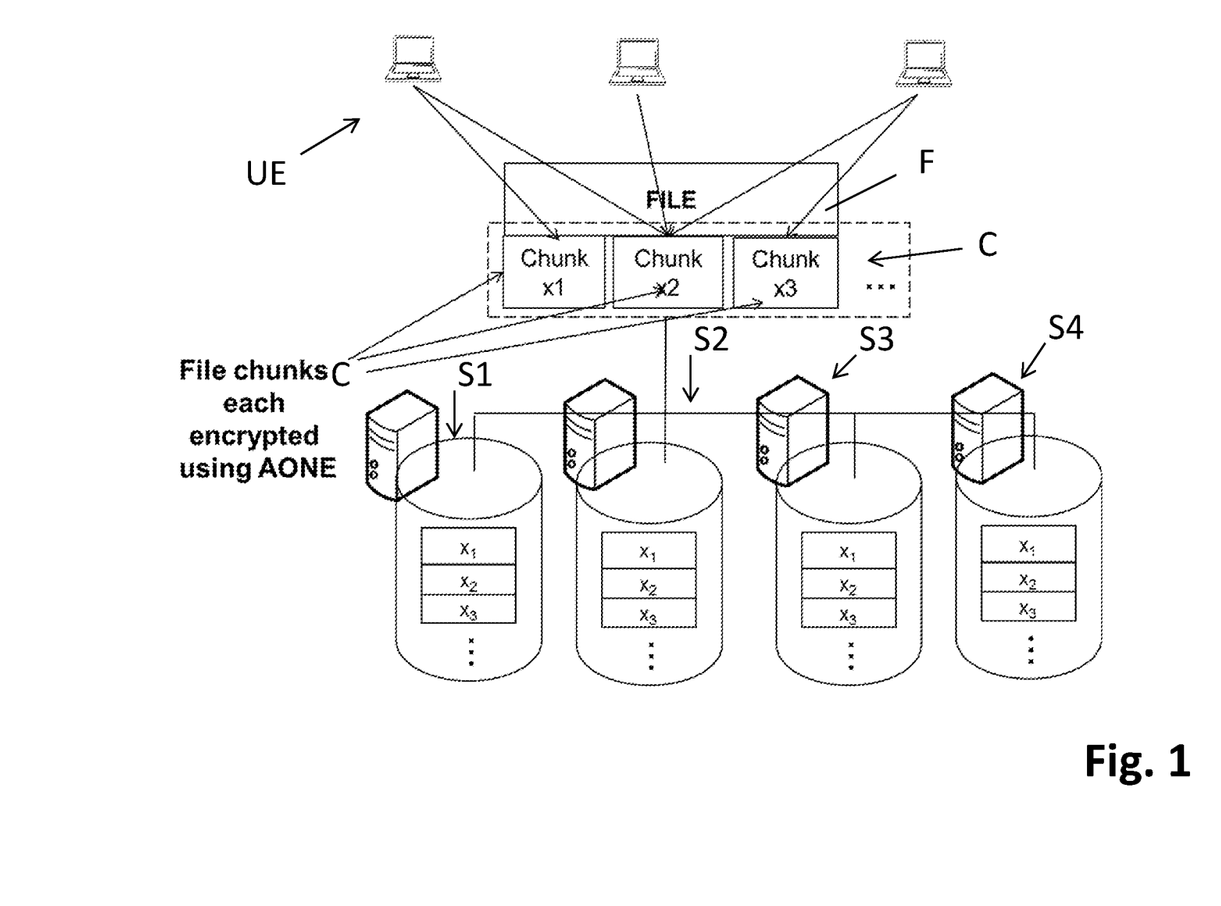
FIG. 1 shows a conventional system.

A conventional method is for example shown in FIG. 1, relying on the access control layer at the server side as a deterrent. However one of the drawbacks is that the notion of All-Or-Nothing is relaxed. Indeed, each block output by All-Or-Nothing Encryption only depends on the encryption of m/N other blocks therefore security of the encrypted data is not high.

SUMMARY

In an embodiment, the present invention provides a method for encrypting data for storage on one or more servers. The data, which includes a first number m of plaintext blocks, is divided into a second number N of equal sized chunks, wherein the second number is based on a number of the one or more servers on which the encrypted data is to be stored, and wherein each of the chunks includes m/N plaintext blocks. Each of the chunks is encrypted using an all-or-nothing encryption (AONE) scheme so as to output a plurality of ciphertext blocks for each of the chunks, wherein an additional randomness is embedded into the AONE scheme by an initialization vector derived from the randomness being used as an initial seed for an AONE initialization vector of the AONE scheme. The randomness is encrypted using an XOR-combination of XOR operations performed on the ciphertext blocks for each of the chunks. The encrypted randomness is stored on each of the one or more servers

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

A method and a system are described herein for at least partially updating data encrypted with an All-or-Nothing Encryption scheme supporting partial file updates on content that has been encrypted by using an All-or-Nothing Encryption AONE.

A method and a system are described herein for at least partially updating data encrypted with an All-or-Nothing Encryption scheme which strengthen the overall security of the encrypted data.

A method and a system are described herein for at least partially updating data encrypted with an All-or-Nothing Encryption scheme enabling an implementation in an easy way and a sufficient performance.

A method for at least partially updating data encrypted with an all-or-nothing encryption scheme stored on one or more servers is described herein that is characterized by:

a) Dividing the data comprising a first number of m plaintext blocks into a second number N of equal sized chunks, wherein the second number is based on the number of servers on which said data is to be stored, such that each chunk comprises m/N blocks of the plaintext blocks,
b) Encrypting each of the chunks using an All-Or-Nothing Encryption Scheme with an encryption key, wherein an additional randomness per chunk is embedded into the All-Or-Nothing Encryption scheme, and outputting a plurality of ciphertext blocks for each chunk,
c) Storing the encrypted chunks on the N servers such that the i-th ciphertext block of each encrypted chunk is stored on the i-th server, and wherein a result of a predetermined function performed on said randomness for all encrypted chunks is stored with each encrypted chunk,
d) Determining one or more parts of one or more chunks which need to be updated if any,
e) Reverting said function by accessing all the chunks to acquire the randomness of said determined one or more chunks,
f) Decrypting said determined chunks based on the result of step e),
g) Updating the decrypted chunks,
h) Re-encrypting the updated chunks using said All-Or-Nothing Encryption scheme, and
i) Storing the re-encrypted chunks according to step c).

A system for at least partially updating data encrypted with an all-or-nothing encryption scheme stored on one or more servers is described herein that is characterized by an updating entity arranged to perform the following steps:

a) Dividing the data comprising a first number of m plaintext blocks into a second number N of equal sized chunks, wherein the second number is based on the number of servers on which said data is to be stored, such that each chunk comprises m/N blocks of the plaintext blocks,
b) Encrypting each of the chunks using an All-Or-Nothing Encryption scheme with an encryption key, wherein an additional randomness per chunk is embedded into the All-Or-Nothing Encryption scheme, and outputting a plurality of ciphertext blocks for each chunk,
c) Storing the encrypted chunks on the N servers such that the i-th ciphertext block of each encrypted chunk is stored on the i-th serve, and wherein a result of a predetermined function performed on said randomness for all encrypted chunks is stored with each encrypted chunk,
d) Determining one or more parts of one or more chunks which need to be updated if any
e) Reverting said function by accessing all the chunks to acquire the randomness of said determined one or more chunks,
f) Decrypting said determined chunks based on the result of step e),
g) Updating the decrypted chunks,
h) Re-encrypting the updated chunks using said All-Or-Nothing Encryption scheme, and
i) Storing the re-encrypted chunks according to step c).

Partial-only file updates are inherently supported by methods and systems described herein.

A higher level of security compared to conventional security provisions of conventional All-or-Nothing Encryption schemes is provided by methods and systems described herein.

Efficiency is enhanced by methods and systems described herein since files which are often accessed, updated, and modified can be more easily updated without having to decrypt and re-encrypt the complete files without reducing the level of security.

Resistance against an internal adversary who can steal parts of the internal memory of the encryption/decryption procedures is provided by methods and systems described herein.

A simple and easy-to-implement method and system are provided by methods and systems described herein for updating files.

According to a preferred embodiment, randomness is used as initial seed for the AONE initialization vector of the All-or-Nothing Encryption scheme—IVANOE—. This enhances the All-or-Nothing principle, therefore enhancing the security.

According to a further preferred embodiment the IVAONE is derived from said randomness. This provides a simple and efficient way for providing respectively deriving the IVAONE.

According to a further preferred embodiment the IVAONE for an (i+1)-th chunk is determined based on performing a hash-function on the IVAONE for the i-th chunk, wherein the IVAONE for the first chunk is determined by calculating said hash-function on the randomness. This allows in an easy and efficient way to derive the IVAONE from the randomness.

According to a further preferred embodiment the randomness is encrypted using as encryption key an XOR-combination of all ciphertext blocks output in step b)—XOREK—and said encrypted randomness is stored in all servers wherein for decrypting according to step e) XOREK is used. This ensures that entity needs to access all blocks in order to compute the XOR-combination and to decrypt the randomness which is then used to decrypt each underlying All-or-Nothing encryption AONE.

According to a further preferred embodiment a fast-fourier-transform All-or-Nothing transform—FFT-AONT—is applied prior or after the encryption using the AONE. Therefore a fast-fourier-transform procedure and an encryption procedure is performed. This ensures that the entity which has been revoked needs to store the randomness, the encryption key and all the blocks of a chunk in order to recover partial the data instead of only having one access to all blocks: The entity can then partially decrypt data if it additionally stores the randomness and the encryption key and additional internal states for example.

According to a further preferred embodiment all data encrypted with the all-or-nothing encryption scheme stored on said one or more servers is determined to be updated. This ensures that an adversary who has access to the data and which has been revoked later on needs the store the encryption key and all the data blocks in order to recover any bit of information.

FIG. 1 shows a conventional system.

In FIG. 1 a conventional system based on access control is provided enabling partial updates of a file.

In FIG. 1 an updating entity UE wants to partially updating a file F. The file F has been encrypted and stored on a plurality of servers SV1-SV4 by the following steps:

In a first step and assuming that they are N servers—here in FIG. 1 N=4 servers SV1-SV4—the original plaintext file F is divided into original m plaintext blocks which are in turn divided into N equal sized chunks so that each chunk contains m/N blocks of the original plaintext blocks and wherein N is the number of servers, here 4.

In a second step an All-or-Nothing encryption AONE is applied on each separate chunk C, preferably by using a All-or-Nothing encryption scheme as disclosed in the non-patent literature of Ghassan Karame, Claudio Soriente, Krzysztof Lichota, Srdjan Capkun, Technical Report, Available from: https://eprint.iacr.org/2014/556.pdf Of course any All-or-Nothing Encryption scheme can be used.

In a further step the All-or-Nothing Encryption scheme outputs a plurality of ciphertext blocks for each chunk, denoted by $c_{ij}$, wherein the index i denotes the number of the ciphertext block and the index j denotes the chunk. For all chunks j=1, N, the i-th ciphertext block $c_{ij}$ is stored in server $S_i$.

If it is determined that some part in chunk j needs to be updated only chunk j is decrypted and re-encrypted using the All-or-Nothing Encryption AONE and then stored appropriately on the servers SV1-SV4. An adversary needs to break into all servers SV1-SV4 and acquire the encryption key in order to be able to decrypt any bit of plaintext. For example this helps in resisting against an adversary who can compromise internal memory. Using the All-or-Nothing Encryption scheme as e.g. disclosed in the non-patent literature of Ghassan Karame, Claudio Soriente, Krzysztof Lichota, Srdjan Capkun, Technical Report, Available from: https://eprint.iacr.org/2014/556.pdf the adversary has to compromise 128N bits of data in order to be able to access any ciphertext of choice later on.

Figure 2:
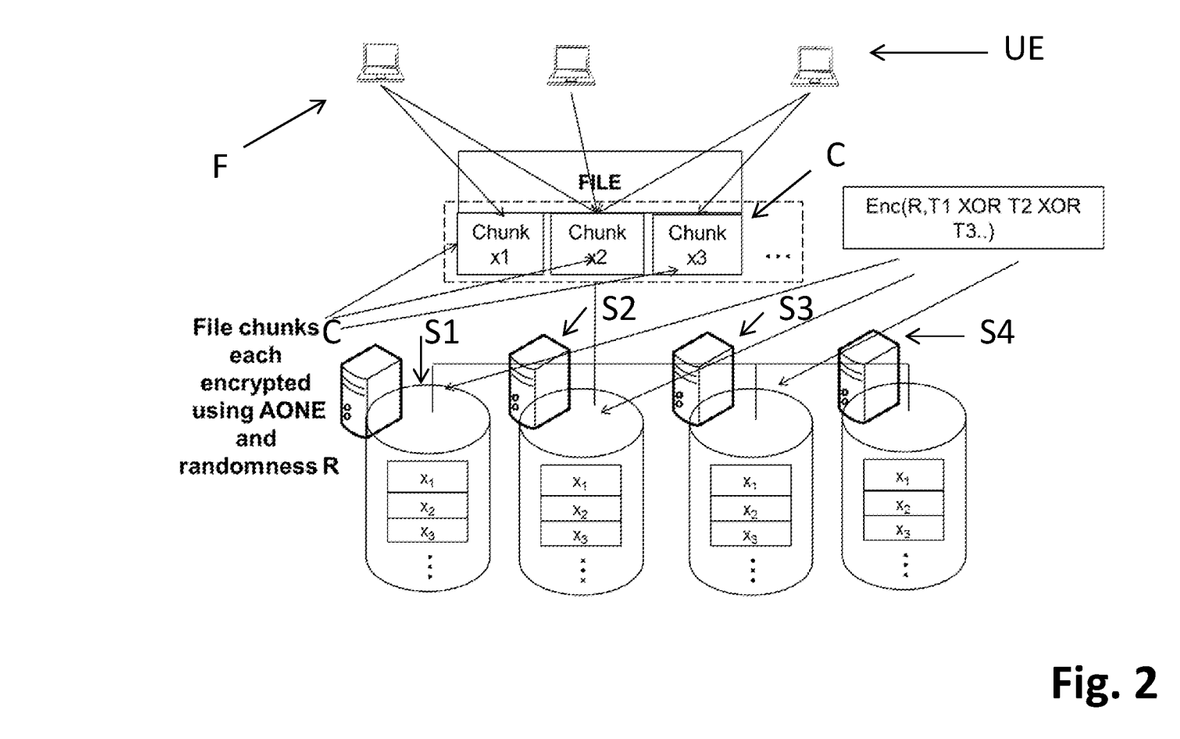
FIG. 2 shows a system according to a first embodiment of the present invention.

FIG. 2 shows a system according to a first embodiment of the present invention.

The method shown in FIG. 1 allows for partial updates of a file but relaxes the notion of the All-or-Nothing principle. Each output block by the All-or-Nothing encryption of FIG. 1 only depends on the encryption of m/N other blocks. In the following a lightweight cryptography based method according to an embodiment of the present invention is shown:

The first step of this embodiment is identical to the first step disclosed in FIG. 1.

In a second step the All-or-Nothing encryption AONE is applied on each separate chunk C using an encryption key K. In addition to the method disclosed in FIG. 1 an additional randomness R is embedded in the creation of each All-or-Nothing Encryption AONE. The randomness R is used as an initial seed for the initialization vector IV in all All-or-Nothing Encryption AONE. In the following the initialization vector is not included in the ciphertext but is only derived from the randomness R.

For example the initialization vector for the first chunk may be set to H(R), i.e. a hash function is computed over the randomness R. The initialization vector for chunk 2 is H(H(R)) and so on.

In a next step for each chunk the XOR operation of all blocks is computed. By denoting Ti the XOR of all blocks in chunk i, the randomness R is encrypted using the new key as an XOR-combination of all Ti: T1 XOR T2 XOR . . . XOR Tn. The encrypted randomness is stored on all the servers SV1-SV4. This ensures that an adversary entity needs to access all blocks in order to compute T1 XOR T2 XOR XOR Tn and to decrypt the randomness R which is then used to decrypt each underlying All-or-Nothing Encryption AONE.

The method shown in FIG. 2 inherently supports partial file updating. If some part of chunk j needs to be updated only chunk j is decrypted in re-encrypted using AONE in stored appropriately on the servers SV1-SV4.

Figure 3:
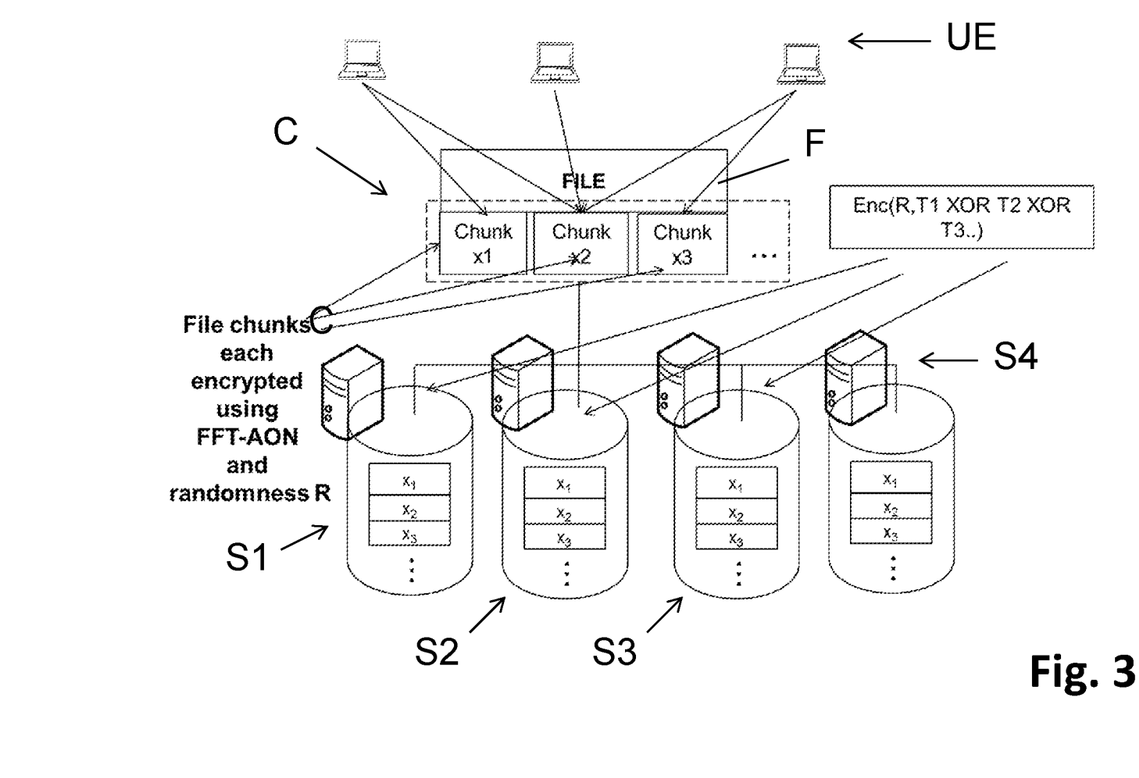
FIG. 3 shows a system according to a second embodiment of the present invention.

FIG. 3 shows a system according to a second embodiment of the present invention.

A method according to the embodiment of FIG. 2 ensures that to require a single plaintext block any entity has to have access to all ciphertext blocks. However once the entity had one access to all blocks then the entity can partially decrypt data if it additionally stores the randomness R and the encryption key K and additional internal state for example.

In the following an embodiment is shown ensuring that the entity which has been revoked needs to store the randomness R, the encryption key K and all the blocks of a chunk in order to recover partial data: In general the embodiment of the method shown in FIG. 3 comprises the same steps as described in the description of FIG. 2. However in contrast to the method in FIG. 2 a Fast-Fourier Transform All-or-Nothing Encryption to each chunk is provided. Also the Fast-Fourier Transform All-or-Nothing Encryption can be applied to the data in its entirety. This ensures that an adversary having access to the data and revoking later on needs to store the encryption key and all data blocks in order to recover any bit of information.

In the following a procedure for performing a Fast-Fourier Transform All-or-Nothing transform is shown. It is assumed that E(X, Y, Z) is a block cipher encrypting (Y||Z) using the key X.

Figure 4:
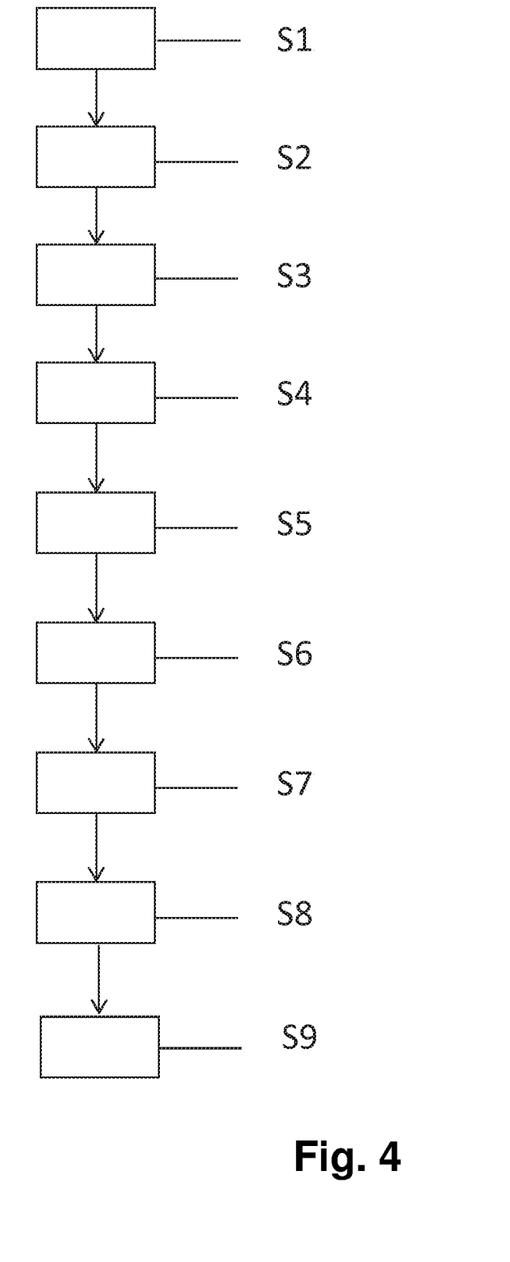
FIG. 4 shows steps of a method according to a third embodiment of the present invention.

Algorithm 1: Algorithm of FFT-AONT. Here, we assume that E(X, Y, Z) is a block cipher that encrypts Y||Z using key X.

for j = 1,..., log(n) do
    for l = 0,..., $2^j$ − 1 do
        for i = 0,...,$2^{j-1}$ − 1 do
            $x^j[i+l*(2^j)]$, $x^j[i+l*(2^j)+2^i(j-1)]$ = E(K, $x^{j-1}[i+1*(2^j)]$, $x^{j-1}[i+1*(2^j)+2^i(j-1)]$)
        end for
    end for
end for FIG. 4 shows steps of a method according to a third embodiment of the present invention.

In FIG. 4 in a first step S1 the data comprising a first number of m plaintext blocks is divided into a second number N of equal sized chunks, wherein the second number is based on the number of servers on which said data is to be stored, such that each chunk comprises m/N blocks of the plaintext blocks.

In a second step S2 each of the chunks is encrypted using an All-Or-Nothing Encryption Scheme with an encryption key, wherein an additional randomness per chunk is embedded into the All-Or-Nothing Encryption scheme, and a plurality of ciphertext blocks for each chunk is output.

In a third step S3 the encrypted chunks are stored on the N servers such that the i-th ciphertext block of each encrypted chunk is stored on the i-th server, and wherein a result of a predetermined function performed on said randomness for all encrypted chunks is stored with each encrypted chunk.

In a fourth step S4 one or more parts of one or more chunks which need to be updated if any are determined.

In a fifth step S5 said function is reverted by accessing all the chunks to acquire the randomness of said determined one or more chunks.

In a sixth step S6 said determined chunks based on the result of step S5 are decrypted.

In a seventh step S7 the decrypted chunks are updated.

In an eighth step S8 the updated chunks using said All-Or-Nothing Encryption scheme are re-encrypted, and In a ninth step S9 the re-encrypted chunks are stored according to step S3.

The servers SV1-SV4 shown in the FIG. 1-3 can for example be part of a multi-cloud storage system leveraging a number of commodity cloud providers with the goal of distributing trust across different administrative domains. Such a "cloud of clouds" model is receiving increasing attention nowadays with leading cloud storage providers offering products for multi-cloud systems.

In FIG. 1-4 a system of 4 storage servers SV1, SV2, SV3, SV4 and a collection of users represented by updating entities UE are assumed as well as that the servers SV1-SV4 appropriately authenticates the users.

In summary embodiments of the present invention provide the use of All-or-Nothing Encryption schemes with a lightweight encryption technique in order to efficiently support partial file updates on data which has been encrypted using All-or-Nothing Encryption techniques.

Further, embodiments of the present invention enhance existing All-or-Nothing encryption schemes by combination of access control mechanisms and lightweight cryptography to resist against an internal adversary who can steal parts of the internal memory of the encryption/decryption routines.

Embodiments of the present invention have inter alia the following advantages: The present invention enables to enhance the security of "hot files." These "hot files" are often accessed, updated and modified.

Embodiments of the present invention have further the advantage to inherently support partial file updates and still maintain a decent level of security when compared to the security provisions of conventional All-or-Nothing encryption schemes.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for encrypting data for storage on one or more servers, the method comprising:

dividing the data, which includes a first number m of plaintext blocks, into a second number N of equal sized chunks, wherein the second number is based on a number of the one or more servers on which the encrypted data is to be stored, and wherein each of the chunks includes m/N plaintext blocks;

encrypting each of the chunks using an all-or-nothing encryption (AONE) scheme so as to output a plurality of ciphertext blocks for each of the chunks, wherein an additional randomness is embedded into the AONE scheme by an initialization vector derived from the randomness being used as an initial seed for an AONE initialization vector of the AONE scheme;

encrypting the randomness using an XOR-combination of XOR operations performed on the ciphertext blocks for each of the chunks; and storing the encrypted randomness on each of the one or more servers, wherein the encrypted chunks are stored in respective memories of the one or more servers such that an i-th ciphertext block of each of the encrypted chunks is stored on an i-th server, and wherein the one or more servers are part of a multi-cloud storage system having different administrative domains.

2. The method according to claim 1, wherein an initialization vector for an (i+1)-th chunk is determined by performing a hash-function on an initialization vector for an i-th chunk, and wherein an initialization vector for a first chunk is determined by calculating the hash-function on the randomness.

3. The method according to claim 1, wherein a Fast-Fourier-Transform All-Or-Nothing transform (FFT-AONT) is applied prior to or after the encrypting of each of the chunks using the AONE scheme.

4. A system for encrypting data for storage on one or more servers, the system comprising:

memory and one or more processors which, alone or in combination, are configured to provide for execution of:

dividing the data, which includes a first number m of plaintext blocks, into a second number N of equal sized chunks, wherein the second number is based on a number of the one or more servers on which the encrypted data is to be stored, and wherein each of the chunks includes m/N plaintext blocks;

encrypting each of the chunks using an all-or-nothing encryption (AONE) scheme so as to output a plurality of ciphertext blocks for each of the chunks, wherein an additional randomness is embedded into the AONE scheme by an initialization vector derived from the randomness being used as an initial seed for an AONE initialization vector of the AONE scheme;

encrypting the randomness using an XOR-combination of XOR operations performed on the ciphertext blocks for each of the chunks; and storing the encrypted randomness on each of the one or more servers, wherein the system is further configured to store or to provide instructions for storing the encrypted chunks in respective memories of the one or more servers such that an i-th ciphertext block of each of the encrypted chunks is stored on an i-th server, and wherein the one or more servers are part of a multi-cloud storage system having different administrative domains.

5. The system according to claim 4, wherein the system is further configured such that an initialization vector for an (i+1)-th chunk is determined by performing a hash-function on an initialization vector for an i-th chunk, and such that an initialization vector for a first chunk is determined by calculating the hash-function on the randomness.

6. The system according to claim 4, wherein the system is further configured to apply a Fast-Fourier-Transform All-Or-Nothing transform (FFT-AONT) prior to or after the encrypting of each of the chunks using the AONE scheme.

7. A method for at least partially updating encrypted data stored in respective memories of one or more servers, the method comprising:
accessing the encrypted data which has been encrypted and stored in the respective memories of the one or more servers in accordance with the following steps:
dividing data, which includes a first number m of plaintext blocks, into a second number N of equal sized chunks, wherein the second number is based on a number of the one or more servers on which the encrypted data is to be stored, and wherein each of the chunks includes m/N plaintext blocks;
encrypting each of the chunks using an all-or-nothing encryption (AONE) scheme so as to output a plurality of ciphertext blocks for each of the chunks, wherein an additional randomness is embedded into the AONE scheme by an initialization vector derived from the randomness being used as an initial seed for an AONE initialization vector of the AONE scheme;
encrypting the randomness using an XOR-combination of XOR operations performed on the ciphertext blocks for each of the chunks; and
storing the encrypted randomness on each of the one or more servers,
wherein the encrypted chunks are stored in the respective memories of the one or more servers such that an i-th ciphertext block of each of the encrypted chunks is stored on an i-th server, and
wherein the one or more servers are part of a multi-cloud storage system having different administrative domains;
determining one or more parts of one or more of the chunks to update;
decrypting the randomness by accessing all the encrypted chunks to compute the XOR-combination;
decrypting the one or more chunks to update using the decrypted randomness; and
updating the decrypted chunks.

8. The method according to claim 7, further comprising re-encrypting the updated decrypted chunks using the AONE scheme, and storing the re-encrypted chunks in the respective memories of the one or more servers such that the i-th ciphertext block of each of the encrypted chunks is stored on the i-th server.

9. A system for at least partially updating encrypted data which has been stored in respective memories of one or more servers, the system comprising:
memory and one or more processors which, alone or in combination, are configured to provide for execution of:
accessing the encrypted data which has been encrypted and stored in the respective memories of the one or more servers in accordance with the following steps:
dividing data, which includes a first number m of plaintext blocks, into a second number N of equal sized chunks, wherein the second number is based on a number of the one or more servers on which the encrypted data is to be stored, and wherein each of the chunks includes m/N plaintext blocks;
encrypting each of the chunks using an all-or-nothing encryption (AONE) scheme so as to output a plurality of ciphertext blocks for each of the chunks, wherein an additional randomness is embedded into the AONE scheme by an initialization vector derived from the randomness being used as an initial seed for an AONE initialization vector of the AONE scheme;
encrypting the randomness using an XOR-combination of XOR operations performed on the ciphertext blocks for each of the chunks; and
storing the encrypted randomness on each of the one or more servers,
wherein the encrypted chunks are stored in the respective memories of the one or more servers such that an i-th ciphertext block of each of the encrypted chunks is stored on an i-th server, and
wherein the one or more servers are part of a multi-cloud storage system having different administrative domains;
determining one or more parts of one or more of the chunks to update;
decrypting the randomness by accessing all the encrypted chunks to compute the XOR-combination;
decrypting the one or more chunks to update using the decrypted randomness; and
updating the decrypted chunks.

10. The system according to claim 9, wherein the updating entity is further configured to re-encrypt the updated decrypted chunks using the AONE scheme, and store the re-encrypted chunks in the respective memories of the one or more servers such that the i-th ciphertext block of each of the encrypted chunks is stored on the i-th server.

11. A tangible, non-transitory computer-readable medium having instructions thereon, which upon being executed by one or more processors with access to memory, provide for execution of a method for encrypting data for storage on one or more servers, the method comprising:
dividing the data, which includes a first number m of plaintext blocks, into a second number N of equal sized chunks, wherein the second number is based on a number of the one or more servers on which the encrypted data is to be stored, and wherein each of the chunks includes m/N plaintext blocks;
encrypting each of the chunks using an all-or-nothing encryption (AONE) scheme so as to output a plurality of ciphertext blocks for each of the chunks, wherein an additional randomness is embedded into the AONE scheme by an initialization vector derived from the randomness being used as an initial seed for an AONE initialization vector of the AONE scheme;
encrypting the randomness using an XOR-combination of XOR operations performed on the ciphertext blocks for each of the chunks; and
storing the encrypted randomness on each of the one or more servers,
wherein the encrypted chunks are stored in respective memories of the one or more servers such that an i-th ciphertext block of each of the encrypted chunks is stored on an i-th server, and
wherein the one or more servers are part of a multi-cloud storage system having different administrative domains.

* * * * *